(12) United States Patent
Herzog

(10) Patent No.: US 7,819,234 B2
(45) Date of Patent: Oct. 26, 2010

(54) BOTTLE ORIENTING DEVICE

(76) Inventor: Kenneth J. Herzog, c/o KAPS-ALL Packaging Systems Inc., 34 Hinda Blvd., Riverhead, NY (US) 11901

( * ) Notice: Subject to any disclaimer, the term of this patent is extended or adjusted under 35 U.S.C. 154(b) by 1 day.

(21) Appl. No.: 12/266,391

(22) Filed: Nov. 6, 2008

(65) Prior Publication Data

US 2010/0108466 A1      May 6, 2010

Related U.S. Application Data

(60) Provisional application No. 61/110,388, filed on Oct. 31, 2008.

(51) Int. Cl.
*B65G 47/24* (2006.01)
(52) U.S. Cl. ....................... 198/399; 198/416
(58) Field of Classification Search ................. 198/399, 198/402, 406, 416
See application file for complete search history.

(56) References Cited

U.S. PATENT DOCUMENTS

| 3,212,668 | A | * | 10/1965 | Gleason et al. ............ 198/399 |
| 3,624,773 | A | * | 11/1971 | Krooss ........................ 198/382 |
| 3,726,387 | A | * | 4/1973 | Krooss ........................ 198/400 |
| 4,148,390 | A | * | 4/1979 | Ionescu ....................... 198/400 |
| 4,257,516 | A | * | 3/1981 | Ionescu ....................... 198/399 |
| 4,328,887 | A | * | 5/1982 | Beard et al. ................. 198/396 |
| 4,463,846 | A | * | 8/1984 | Ionescu ....................... 198/399 |
| 4,483,435 | A | * | 11/1984 | Ionescu ....................... 198/399 |
| 4,844,233 | A | * | 7/1989 | Aidlin et al. ................ 198/394 |

\* cited by examiner

*Primary Examiner*—James R Bidwell
(74) *Attorney, Agent, or Firm*—Ostrolenk Faber LLP

(57) ABSTRACT

A bottle orienting device for orienting bottles including a neck with an opening on one end thereof in accordance with an embodiment of the present application includes a first belt operable to advance a bottle in a first direction, a stationary kicker extending upward relative to a lower surface of the bottle as it moves in the first direction and positioned in a path of travel of the bottle such that the bottle will rotate around the kicker as it passes the kicker, and a rotation deflector positioned above the kicker and upstream from the kicker, the rotation deflector positioned such that it prevents rotation of the bottle when desired.

14 Claims, 6 Drawing Sheets

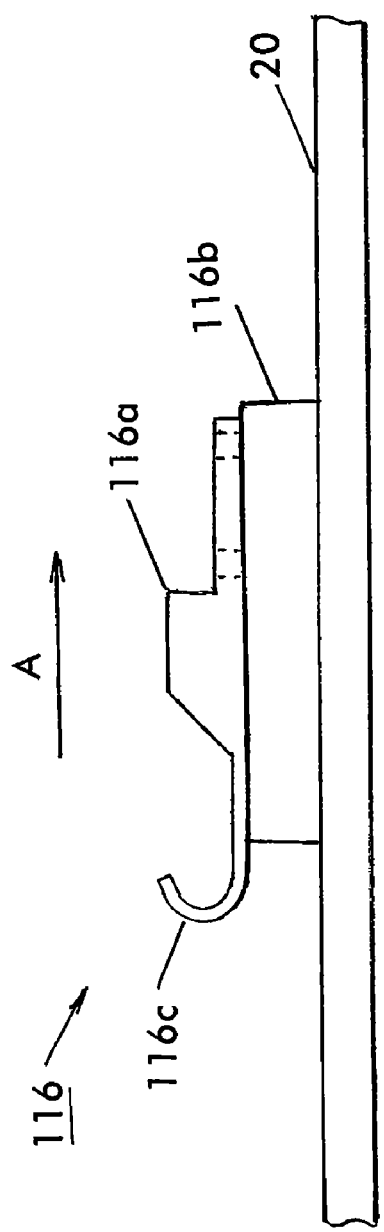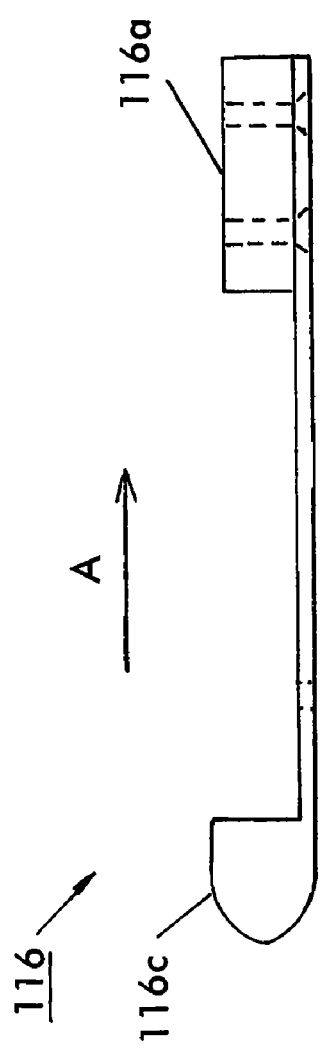

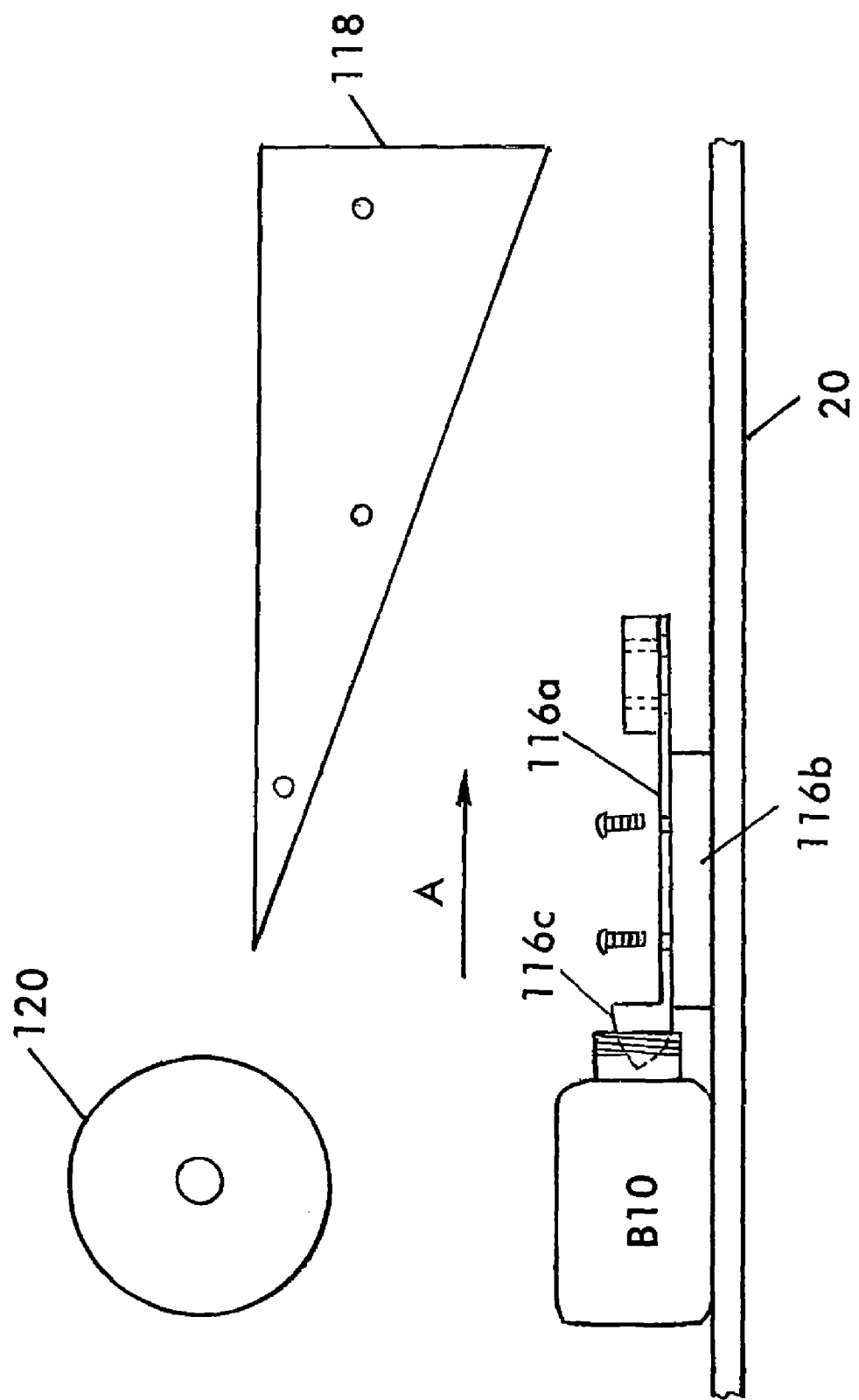

BOTTLE ORIENTING DEVICE

CROSS REFERENCE TO RELATED APPLICATIONS

The present application claims benefit of and priority to U.S. Provisional Patent Application Ser. No. 61/110,388 entitled BOTTLE ORIENTING DEVICE filed Oct. 31, 2008, the entire contents of which are hereby incorporated by reference herein.

BACKGROUND

1. Field of the Disclosure

The present disclosure relates to a bottle orienting device that is used to arrange bottles in a desired configuration, preferably for further processing, for example, in a bottle filling and capping machine. More specifically, the bottle orienting device includes a stationary kicker with an orientating element that is used to orient bottles as desired.

2. Related Art

Bottle filling and capping machines typically include a device that arranges the bottles in a desired orientation so that they can be properly processed by the machine for filling, capping or other additional processing.

While there are several ways to orient bottles for further processing in such a filling machine, prior art orienting devices are often needlessly complicated and unreliable.

Accordingly, it would be beneficial to provide a bottle orienting device, preferably for use in a bottle filling line, that avoids the problems mentioned above.

SUMMARY

It is an object of the present disclosure to provide an improved bottle orienting device operable to set a plurality of bottles in a predefined position for further processing.

A bottle orienting device for orienting bottles including a neck with an opening on one end thereof in accordance with an embodiment of the present application includes a first belt operable to advance a bottle in a first direction, a stationary kicker extending upward relative to a lower surface of the bottle as it advances in the first direction and positioned in a path of travel of the bottle such that the bottle will rotate around the kicker as it passes the kicker, and a rotation deflector positioned above the kicker and upstream from the kicker, the rotation deflector positioned such that it prevents rotation of the bottle when desired.

Other features and advantages of the present invention will become apparent from the following description of the invention, which refers to the accompanying drawings.

BRIEF DESCRIPTION OF THE DRAWING(S)

FIG. 2 is a more detailed view of a kicker of the bottle orienting device of FIG. 1;

FIG. 5 is an illustration of an alternative embodiment of an orienting member of the kicker illustrated in FIG. 2;

FIG. 6 illustrates how the orienting member of FIG. 5 interacts with a neck leading bottle.

DESCRIPTION OF THE EMBODIMENTS

The bottle orienting device of the present application is preferably for use in a bottle orienting machine prior to filling and capping, however, it may be used in other applications as well.

Figure 1:
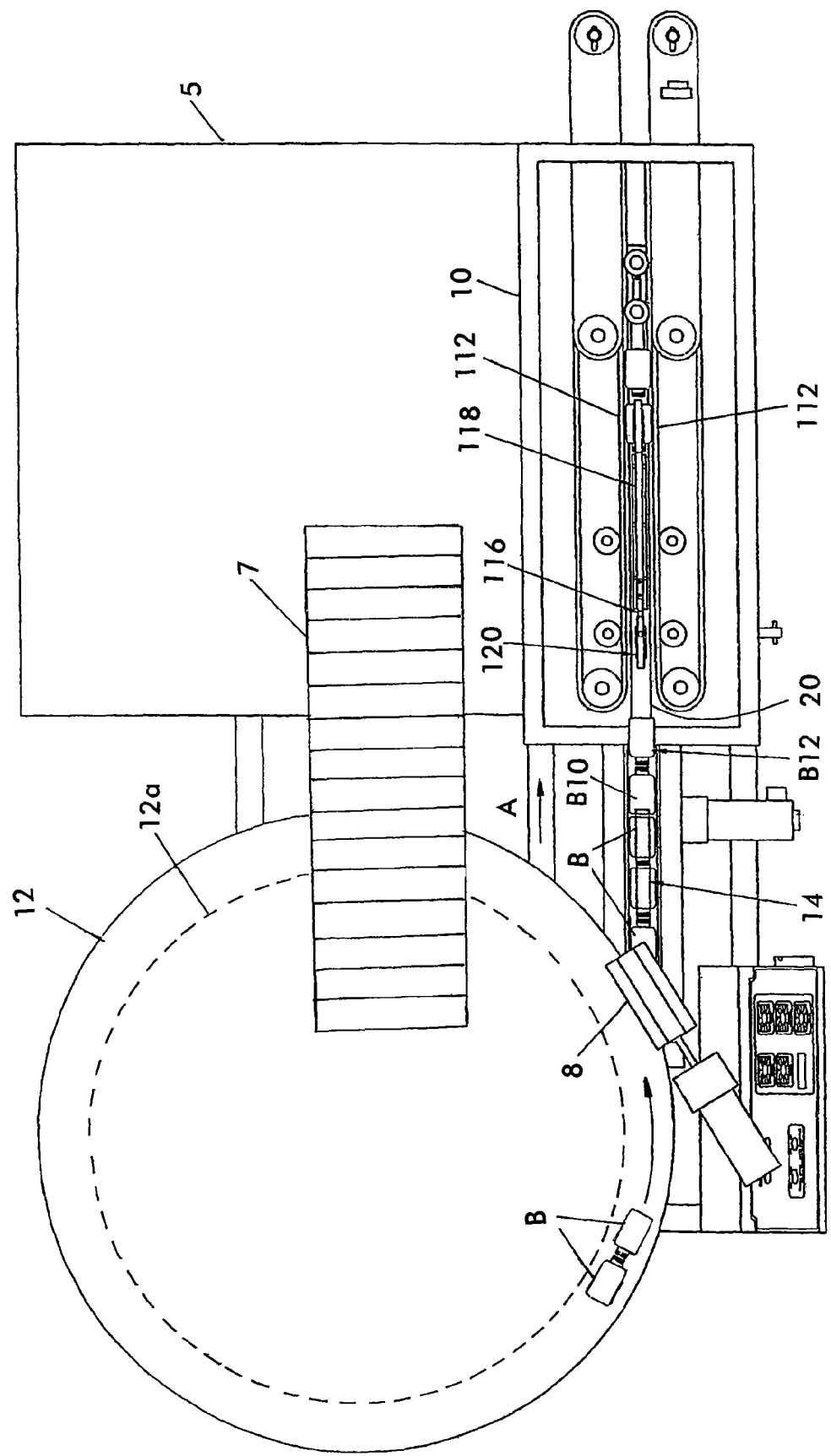
FIG. 1 is an illustration of a bottle orienting machine including a bottle orienting device in accordance with an embodiment of the present application.

FIG. 1 illustrates an exemplary embodiment of a bottle orienting machine 1 in which the bottle orienting device 10 of the present application is preferably used. Generally, a plurality of bottles B is provided to the machine 1. The bottles include a neck, typically adapted to receive a cap, with an opening therein to allow the bottles to be filled. In FIG. 1, the bottles B are first provided to a rotary feeder 12, preferably via a storage hopper 5 and elevator belt device 7, however, any suitable mechanism for providing the bottles B may be used. A rotating disc 12a is provided in the rotary feeder 12 and rotates at a desired speed such that the bottles B are forced to the outer periphery of the disc 12a. At this point, the bottles B are lying on their side in a horizontal position at random in either a neck trailing or neck leading position.

From the rotary feeder 12, the bottles B are provided to a metering belt 14 which transports the bottles in a single line toward the orienting device 10. The metering belt 14 is preferably a rubber motorized belt that moves the bottles B in the direction of arrow A. The metering belt 14 may be bottom mounted, that is, positioned under the bottles B, as illustrated in FIG. 1, or side mounted, that is, adjacent to the bottles. In FIG. 1, a paddle wheel 8 may be used to help knock down the bottles that are vertical and not laying down prior to entering the feeder 12 to the metering belt 14. The metering belt 14 accepts the bottles B one by one from the feeder 12 in a single file. The bottles B may be in a neck leading orientation, for example, bottle B10, or a neck trailing orientation like bottle B12.

From the metering belt 14, the bottles B, B10, B12 are passed to the orienting device 10. Specifically, the metering belt 14 passes the bottles B, B10, B12 to a bottom guide 20 on which they slide as they pass through the device 10. The bottom guide may simply be a substantially flat and low friction surface as indicated in FIG. 1. Alternatively, the guide 20 may simply include two elongated and spaced apart bars that extend parallel to the direction of travel of the bottles B, B10, B12 over the length of the device 10. The lateral spacing between the bars is set such that it is smaller than a width of the bottles B, B10, B12 so that a bottle lying on top of the bars will simply slide along on the bars without falling between them. In another embodiment, a single elongated guide bar may form the bottom guide 20. In addition, the bottom guide 20 may be eliminated altogether as is described further below.

At least one side belt 112 is provided to advance the bottles B, B10, B12 in the direction of arrow A. That belt 112 is provided adjacent to the path of travel of the bottles B, B10, B12 and urges the bottles in the direction of arrow A. In a preferred embodiment, two side belts 112 are provided, one on each side of the line of bottles B, B10, B12. A kicker 116 is mounted in the device 10 such that it extends upward relative to the guide 20 in the path of the bottles B, B10, B12.

In an alternative embodiment, where two side belts 112 are used as illustrated in FIG. 2, the bottom guide 20 may be eliminated altogether with the bottles B, B10, B12 held up and moved forward by the side belts alone. In this case, the kicker 116 is mounted in the device 10 such that it extends upward relative to the lowest surface of the bottle as it is advanced between the belts 112.

FIG. 2 provides a more detailed view of the kicker 116. As can be seen in FIG. 2, the kicker 116 preferably includes an orienting member 116a mounted on a base 116b. The orienting member 116a preferably includes an orienting element 116c that extends beyond an end of the base 116b in the direction from which the bottles B, B10, B12 are received. The orienting element 116c of FIG. 2 has a curved shape that curves away from the direction from which the bottles B, B10, B12 are received, that is, in the direction of the arrow A. However, it is noted that the orienting element 116c is not limited to this curved shape. The kicker 116 engages the bottles B, B10, B12 as they travel in the direction of arrow A, either as they slide along the guide 20 or simply are carried between the belts 112 such that they are in a desired orientation after they pass the kicker 116. Preferably, the bottles B, B10, B12 are all oriented in a neck trailing position after they pass the kicker 116. This will allow the bottles B to be easily repositioned further downstream into a desired position for filling and/or capping, for example.

FIG. 3 illustrates how a bottle B10 that is in a neck leading position as it approaches the kicker 116 is rotated by the kicker 116 to be in a neck trailing position after it passes the kicker. In FIG. 3A, the bottle B10 approaches the kicker 116 in a horizontal position, as is noted above. While not visible in FIG. 3A, the bottle B10 is moved in the direction of arrow A by the side belt, or belts, 112 mentioned above. In FIG. 3B, when the bottle B10 is adjacent to the kicker 116, the orienting element 116c of the orienting member 116a enters the opening in the neck of the bottle B10. The neck of the bottle B10 contacts the base 116b of the kicker 116 as illustrated. It is noted that the height of the base 116b relative to the guide 20, or the lowest surface of the bottle B10, is selected such that the orienting member 116a is aligned with the opening in the neck of the bottle B10. The base 116b is preferably removable from the device 10 as desired, so that a taller, or shorter, base may be provided to accommodate bottles of different sizes. However, the orienting member 116a may generally be used with a base 116b of any height.

Figure 3A:
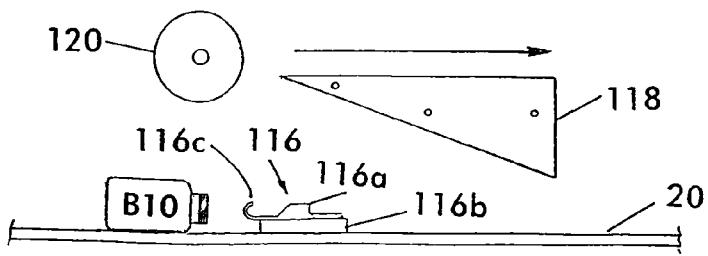
FIG. 3 is an illustration of how the bottle orienting device of the present application properly orients a bottle that is in a neck leading disposition.
Figure 3B:
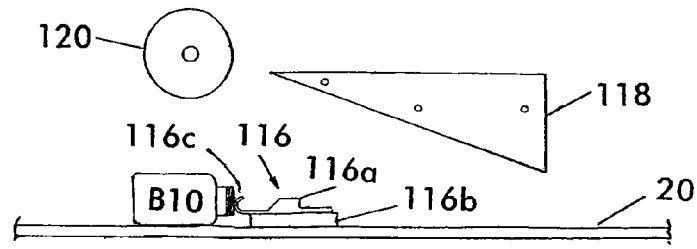
Figure 3C:
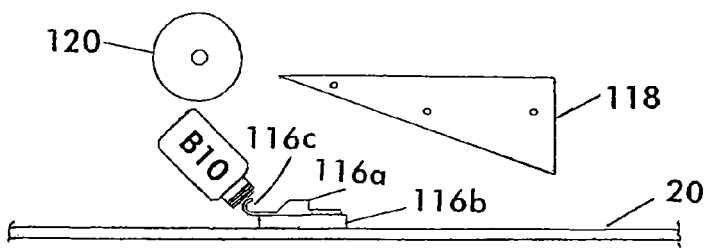
Figure 3D:
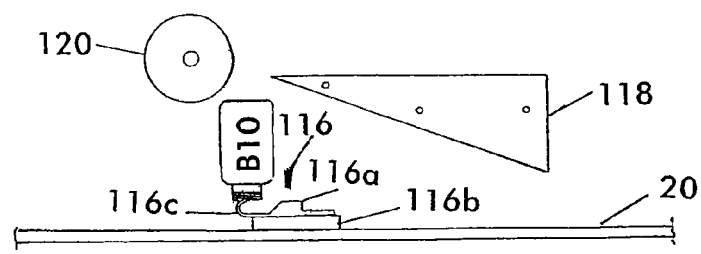
Figure 3E:
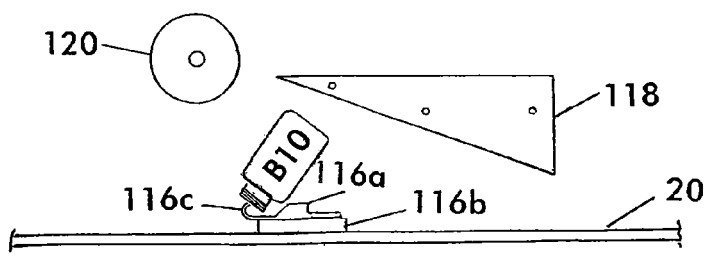
Figure 3F:
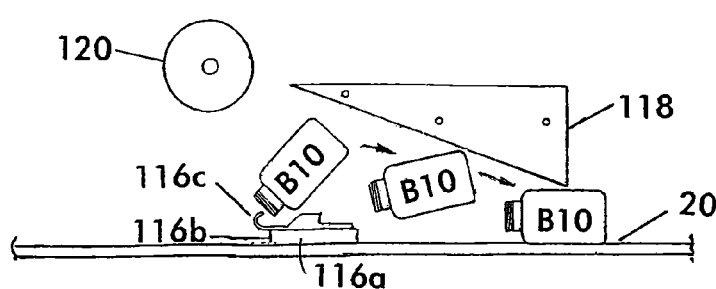

Since the belt, or belts, 112 continue to urge the bottle B10 in the direction indicated by arrow A, and the bottle begins to rotate around the orienting member 116a of the kicker 116, as illustrated by the arrow R in FIG. 3C. In FIG. 3D-FIG. 3E, the bottle B10 continues to rotate until it passes beyond a vertical position into a substantially neck trailing orientation and is released from the orienting element 116c, as illustrated in FIG. 3E, for example. In the particular embodiment of FIGS. 3A-3E, the curved shape of the orienting element 116c which curves in the same direction as the direction of travel of the bottle B10, allows the open part of the orienting element to smoothly release the bottle after it has rotated beyond vertical. An angled deflector 118 is provided further downstream of the kicker 116 and serves to ensure that the bottle B10 settles back down on the guide 20, or to its original height relative to the kicker 116. Thus, after the bottle B10 passes the kicker 116, it is in a neck trailing position.

Figure 4A:
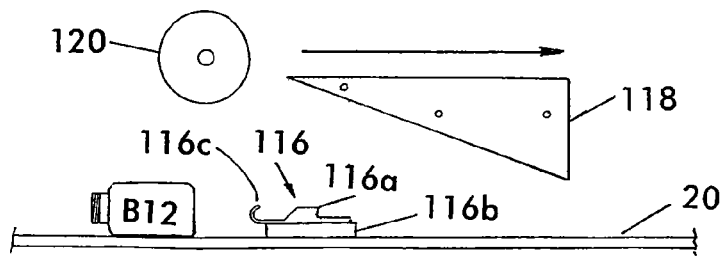
FIG. 4 is an illustration of how the bottle orienting device of the present application properly orients a bottle that is in a neck trailing disposition.
Figure 4B:
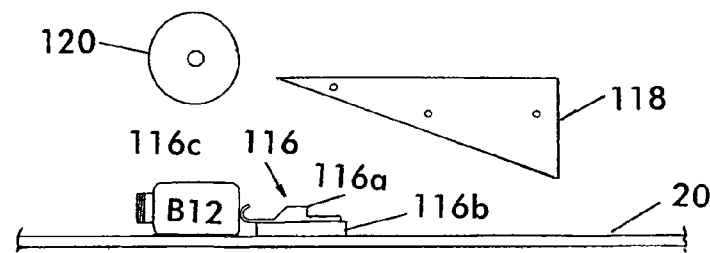
Figure 4C:
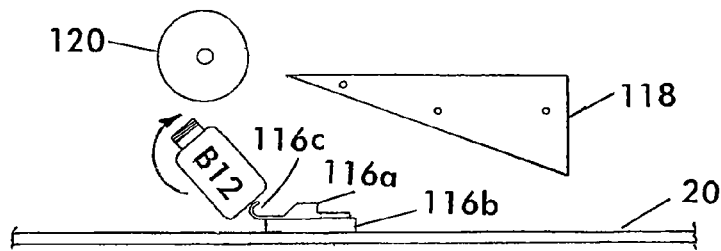
Figure 4D:
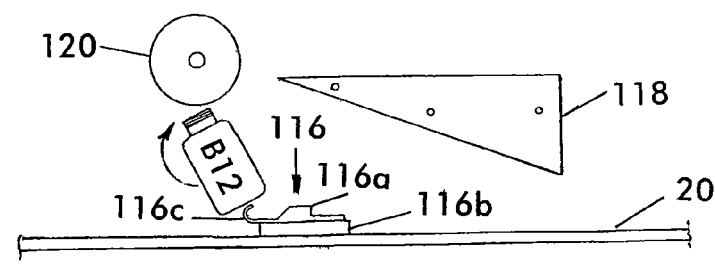
Figure 4E:
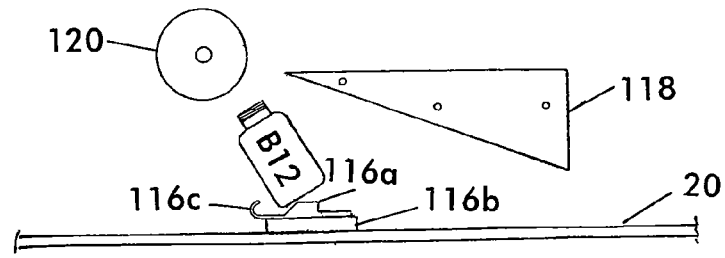
Figure 4F:
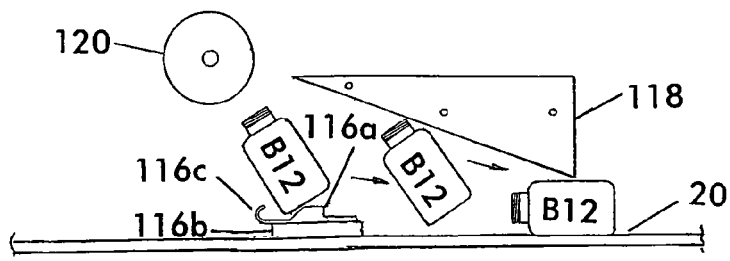

In FIG. 4A, a bottle B12 approaches the kicker 116 in a neck trailing position. In this case, the bottle B12 approaches the kicker 116 with its bottom facing the kicker. The bottom of the bottle B12 contacts the orienting element 116c, which impedes further movement of the bottle in direction A, as can be seen in FIG. 4B. The bottle B12 may then begin to rotate as indicated by arrow R in FIG. 4C. However, since the opening of the bottle B12 faces away from the kicker 116, the orienting element 116c cannot enter the opening. As a result, the bottle B12 is pushed up higher as it rotates. A rotation deflector 120 is positioned slightly upstream from the kicker 116 and mounted above it a predetermined distance. The predetermined distance is set such that a bottle, such as the bottle B10 discussed above, that is rotating with the orienting element 116c positioned in the opening in its neck will not contact the rotation deflector 120 as it rotates. In contrast, as the bottle B12 begins to rotate, since the orienting element 116c is not in its opening, it extends up higher and comes into contact with the rotation deflector 120. The rotation deflector 120 prevents the bottle B12 from continuing its rotation. Instead, the bottle B12 will stop rotating and will slide over the remainder of the orienting member 116a as illustrated in FIGS. 4D-4E, for example. The deflector 118 downstream of the kicker 116 then guides the bottle B12, still in a neck trailing orientation, back down to the guide 20, or to its original height relative to the kicker 116 to continue travelling in the direction of arrow A. Thus, regardless of the starting orientation, the bottle, B10 or B12, will be in a neck trailing position after it passes the kicker 116.

While the figures specifically illustrate the rotation deflector 120 as a wheel, any suitable deflector structure may be used instead. That is, any suitable deflector positioned upstream from and spaced sufficiently above the kicker 116 may be used to limit rotation of the bottle B12, for example. The wheel illustrated in FIGS. 4A-4E is preferred since it can rotate, and thus, prevent the bottle B12 from becoming jammed in the device 10 after it contacts the wheel, however, any deflector element may be used. For example, a simple metal or plastic plate may be used, if desired.

Figure 7:
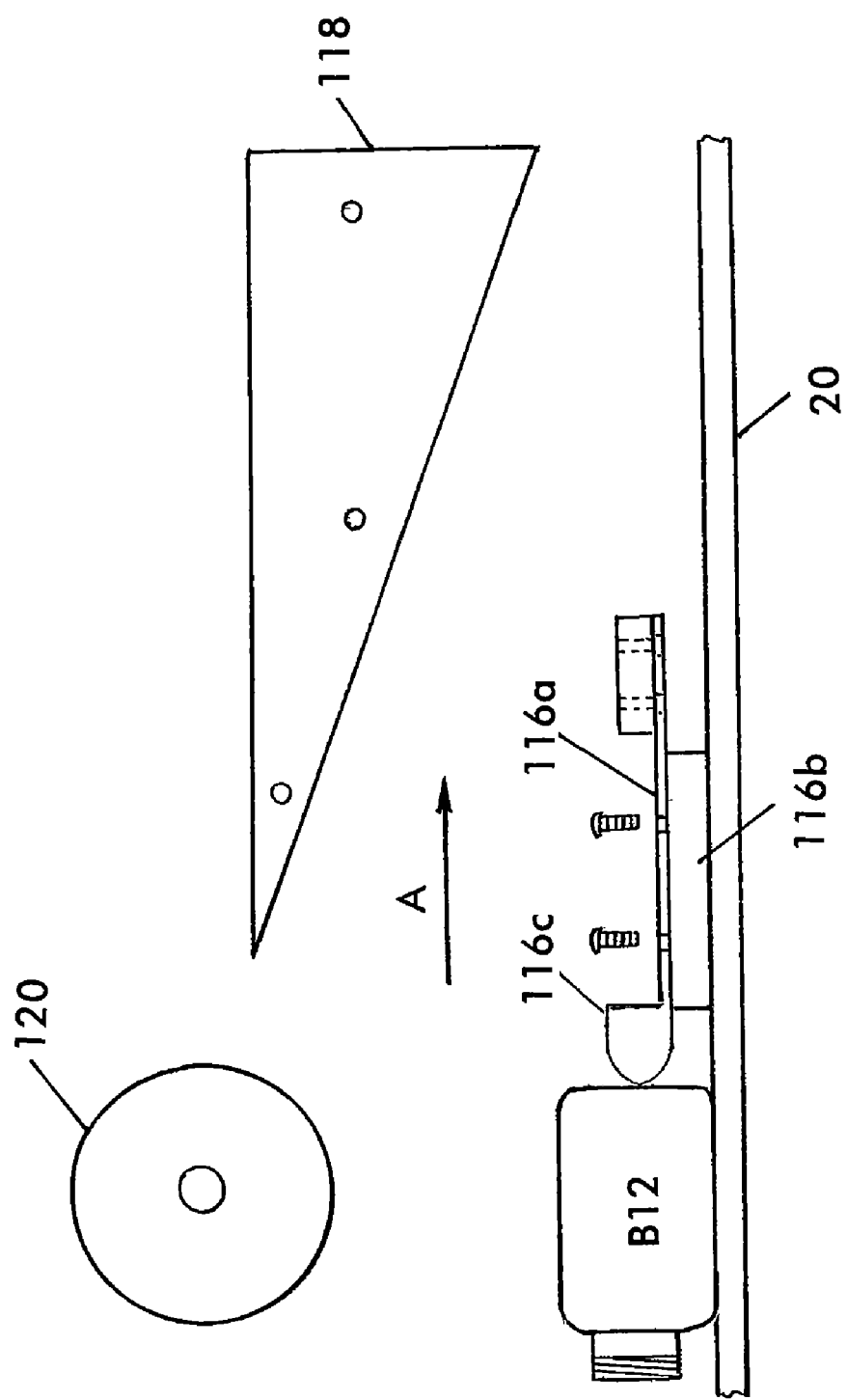
FIG. 7 illustrates how the orienting member of FIG. 5 interacts with a neck trailing bottle.

FIG. 5 illustrates an alternative embodiment of the orienting member 116a. In this embodiment, the orienting member 116a is still mounted on the base 116b however, it does not include the curved orienting element 116c described above and illustrate din FIGS. 2-4. Instead the orienting element 116c is shaped as a blunt protrusion that extends from the side of the orienting member 116a on the side from which the bottles approach the kicker 116. The blunt protrusion extends beyond the corresponding end of the base 116b in a manner similar to the curved orienting element described above with reference to FIGS. 2-4 such that it enters the opening in the neck of an approaching bottle, such as bottle B10, for example. This is illustrated in FIG. 6, for example. Thereafter, the bottle will rotate around the kicker 116 in much the same manner as described above with reference to FIGS. 3B-3E. Similarly, FIG. 7 illustrates how the bottom of a bottle already in the neck trailing position, such as bottle B12, contacts the blunt protrusion. Such a bottle would then begin to rotate but be stopped by the rotation deflector 120 and proceed to slide over the orienting member 116a in a manner similar to that described above with reference to FIGS. 4B-4E. It is noted that the orienting element 116c may be provided in a variety of shapes and is not limited to the curved shape or blunt protrusion described and shown herein.

The orienting device 10 of the present application thus allows for a simple and effective means to orient bottles as desired. The kicker 116 remains stationary, and thus, is easy to install and position. The orienting element 116c engages the bottles B10 that are in a neck leading orientation to ensure that they rotate into the desired neck trailing orientation. Since the curved shape of the curved orienting element illustrated in FIGS. 2-4 curves in the direction of travel of the bottle B10, after the bottle has rotated, the open end of the curved element smoothly releases the bottle. Similarly, the blunt protrusion shape of the orienting element in FIGS. 5-7 also allows for the easy release of the bottle B10 after it has rotated beyond vertical as well. The rotation deflector 120 provides a simple and effective structure to prevent rotation when desired. Further, since the rotation deflector 120 is positioned upstream of the kicker 116, the rotation of the bottle B12 is stopped early on, and thus, the device is very reliable.

The bottles B, B10, B12 are typically forwarded to a flipping section of the machine 1 after they are settled back down on the guide 20 or to their original height relative to the kicker 116 by the deflector 118. This section is illustrated as a part of the device 10 in FIG. 1, however, it may be a separate element altogether. Generally, a second kicker is provided to rotate all of the now neck trailing bottles into a standing upright position which is convenient for filling and capping. However, the bottles need not be stood up after being properly oriented by the device 10 of the present application. Alternatively, or in addition, the bottles may be subjected to other processing as well, if desired.

Although the present invention has been described in relation to particular embodiments thereof, many other variations and modifications and other uses will become apparent to those skilled in the art.

What is claimed is:

1. A bottle orienting device for orienting bottles including a neck with an opening on one end thereof, the bottle orienting device comprising:
    a first belt operable to advance a bottle in a first direction;
    a stationary kicker extending upward relative to a lower surface of the bottle as it advances in the first direction and positioned in a path of travel of the bottle such that the bottle will rotate around the kicker as it passes the kicker, and
    a rotation deflector positioned above the kicker and upstream from the kicker, the rotation deflector positioned such that it prevents rotation of the bottle when desired.

2. The bottle orienting device of claim 1, wherein the rotation deflector is positioned such that when the bottle contacts the kicker in a neck leading orientation, a portion of the kicker enters the opening in the neck and the bottle rotates around the kicker and under the rotation deflector such that it is in a neck trailing orientation after it passes the kicker.

3. The bottle orienting device of claim 2, wherein the rotation deflector is positioned such that when the bottle contacts the kicker in the neck trailing orientation, the rotation deflector prevents full rotation of the bottle such that it remains in the neck trailing orientation after passing the kicker.

4. The bottle orienting device of claim 3, further comprising a deflector positioned above the kicker and downstream from the kicker, wherein the deflector is angled to guide the bottle down after it has passed the kicker.

5. The bottle orienting device of claim 4, further comprising a second belt positioned opposite the first belt with the bottle positioned between the first and second belts, the first belt and second belt both operative to advance the bottle in the first direction.

6. The bottle orienting device of claim 5, wherein the kicker further comprises:
    a base extending up a predetermined height above a lower surface of the bottle; and
    an orienting member mounted on top of the base, the orienting member including an orienting element that extends beyond the base on a side of the orienting member closest to the bottle as it approaches the kicker.

7. The bottle orienting device of claim 6, wherein the orienting element is the portion of the kicker that enters the opening in the bottle when the bottle contacts the kicker in the neck leading orientation.

8. The bottle orienting device of claim 7, wherein the orienting element has a curved shape and the curved shaped curves in the first direction such that the bottle is easily released after it has rotated beyond vertical into a substantially neck trailing orientation.

9. The bottle orienting device of claim 7, wherein the predetermined height that the base extends above the lowest surface of the bottle is set to align the orienting member with the opening in the neck of the bottle.

10. The bottle orienting device of claim 9, wherein the base is replaceable such that a second base having a second predetermined height is provided to accommodate a bottle of a second size.

11. The bottle orienting device of claim 9, further comprising a bottom guide on which the bottle slides as it advances it in the first direction.

12. The bottle orienting device of claim 11, wherein the stationary kicker is mounted on the bottom guide.

13. The bottle orienting device of claim 12, wherein the bottom guide is a substantially flat surface and is made of a low friction material.

14. The bottle orienting device of claim 12, wherein the bottom guide is an elongated guide rail extending a length of the bottle orienting device parallel to the first direction.

* * * * *